June 25, 1963 A. M. MAROTH 3,094,880
SPEED CHANGING MECHANISM

Filed Aug. 9, 1960 3 Sheets-Sheet 1

INVENTOR
Arthur M. Maroth
BY
Blair, Spencer & Buckles
ATTORNEYS

June 25, 1963     A. M. MAROTH     3,094,880
SPEED CHANGING MECHANISM
Filed Aug. 9, 1960     3 Sheets-Sheet 2
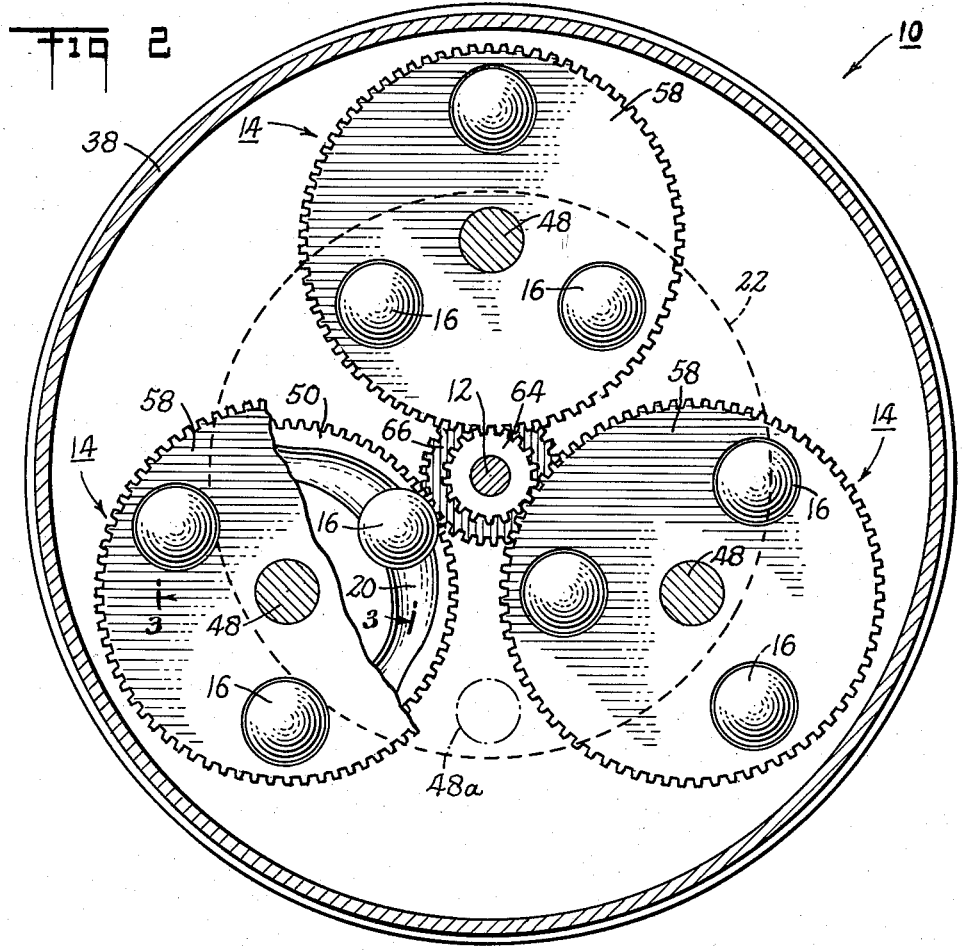
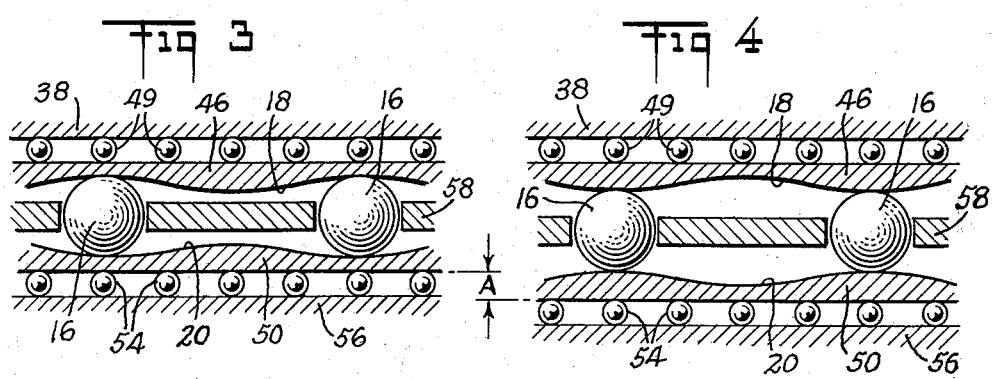
INVENTOR
Arthur M. Maroth
BY
Blair Spencer & Buckles
ATTORNEYS

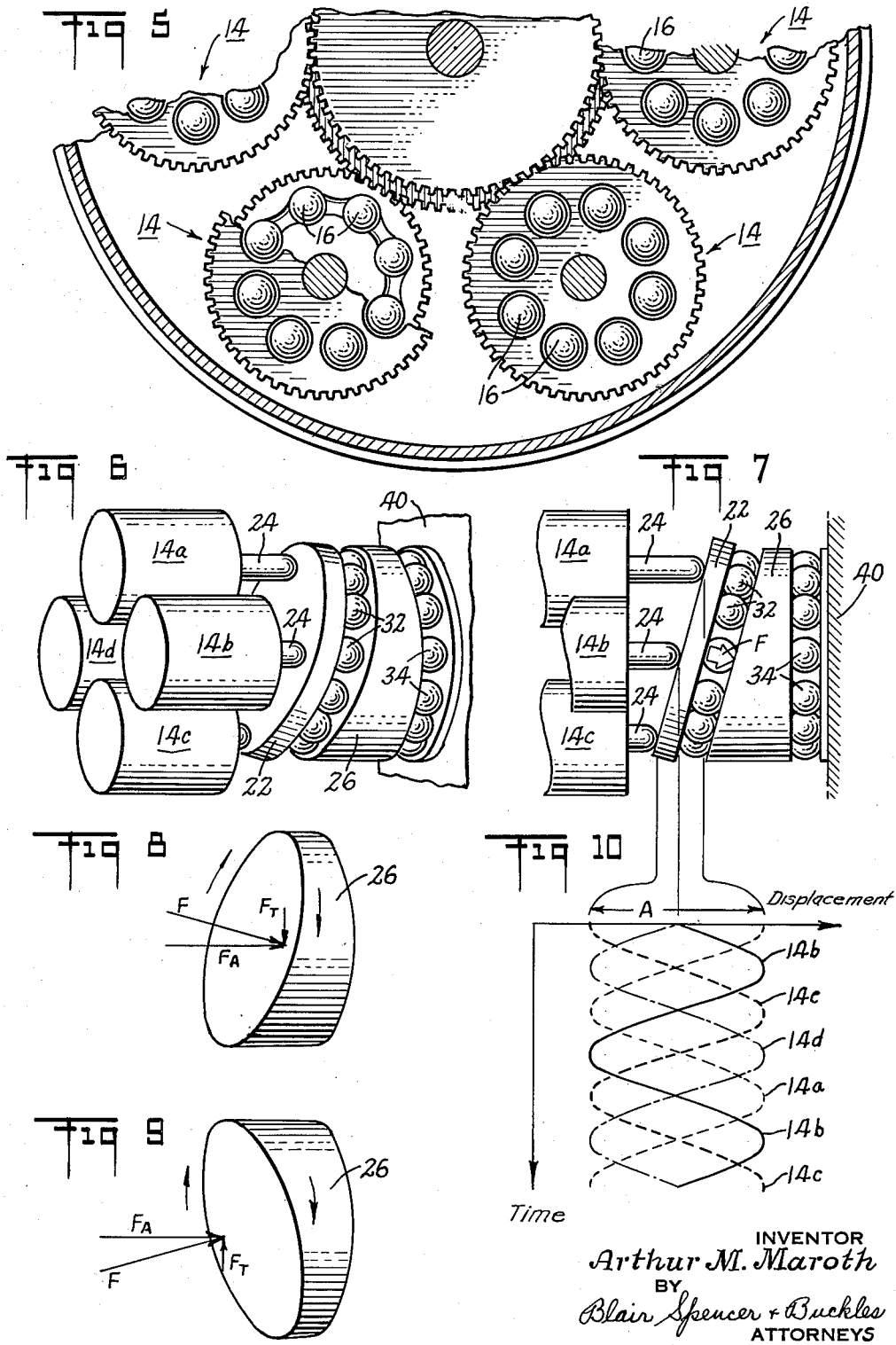

United States Patent Office 3,094,880
Patented June 25, 1963

3,094,880
SPEED CHANGING MECHANISM
Arthur M. Maroth, Grumman Hill Road, Wilton, Conn.
Filed Aug. 9, 1960, Ser. No. 48,482
10 Claims. (Cl. 74—60)

This invention relates to speed-changing mechanisms for converting high velocity rotary motion to corresponding rotary motion of a different rotational velocity, and particularly to speed reduction mechanisms employing rolling-friction wavy-race assemblies for highly-efficient torque conversion.

The development of high-speed turbines such as steam turbines, gas turbines, and the like, has created an important need for dependable and highly-efficient speed reduction mechanisms for converting the high rotational velocities of these power sources to lower speeds, for driving more slowly-rotating units such as propeller shafts, helicopter rotors, generators, or other rotary machinery.

Present torque converters and speed reduction mechanisms generally employ gear trains in which sliding friction seriously decreases operating efficiency. As a practical matter, conversion of high rotational velocities to very low rotational velocities requires a large number of pairs of meshing gears, and the sliding contact of their gear teeth, all carrying the torque under conversion, produces high frictional losses in the reduction mechanism. Furthermore, since every tooth of every gear in such a gear train mechanism must be capable of continuous operation under the full torque load being converted, such torque conversion units must necessarily be heavily built with high ratios of weight and volume to horsepower. The bulky size and heavy weight of such gear reduction mechanisms are therefore a serious disadvantage, often barring their use in installations where space and weight are at a premium, as in aircraft, submarines, or the like. Servomechanism controls for missiles or space vehicles likewise require extremely light-weight and highly-efficient speed reduction mechanisms, heretofore unattainable.

Accordingly, a principal object of the present invention is to provide speed-changing mechanisms capable of converting high rotational velocities to different velocities with maximum efficiency.

Another object of the invention is to provide light-weight speed-changing mechanisms of the above character capable of carrying heavy loads with high reliability.

A further object of the invention is to provide speed reducing mechanisms of the above character substantially smaller in size than prior torque conversion mechanisms.

Another object of the invention is to provide speed reducing mechanisms of the above character adapted for conversion by the installation of various substitute elements to provide preselected speed reduction ratios over a wide range of values.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description, taken in connection with the accompanying drawings, in which:

FIGURE 2 is a sectional end elevation view taken along the line 2—2 of FIGURE 1 and partially cut away, showing the internal construction of the speed reducer of FIGURE 1;

FIGURE 3 is a developed schematic view of the ball-race mechanism shown in FIGURE 2 and taken along the line 3—3 of FIGURE 2;

FIGURE 4 is a similar developed schematic view of the same ball-race mechanism shown in FIGURE 3, in a different point in its operating cycle;

FIGURE 5 is a fragmentary sectional end elevation view similar to the view of FIGURE 2 but showing a different embodiment of the invention employing six input cells with eight balls incorporated in each cell;

FIGURE 6 is a perspective schematic diagram of a speed changing mechanism incorporating a different embodiment of the invention employing four input cells;

FIGURE 7 is a schematic side elevation diagram of the mechanism shown in FIGURE 6, illustrating the transmission of torque to the rotating output member of the mechanism; and FIGURES 8, 9, and 10 are schematic diagrams illustrating the transmission of torque to the rotating output member of the mechanism.

Similar reference characters refer to similar parts throughout the several views of the drawings.

Figure 1:
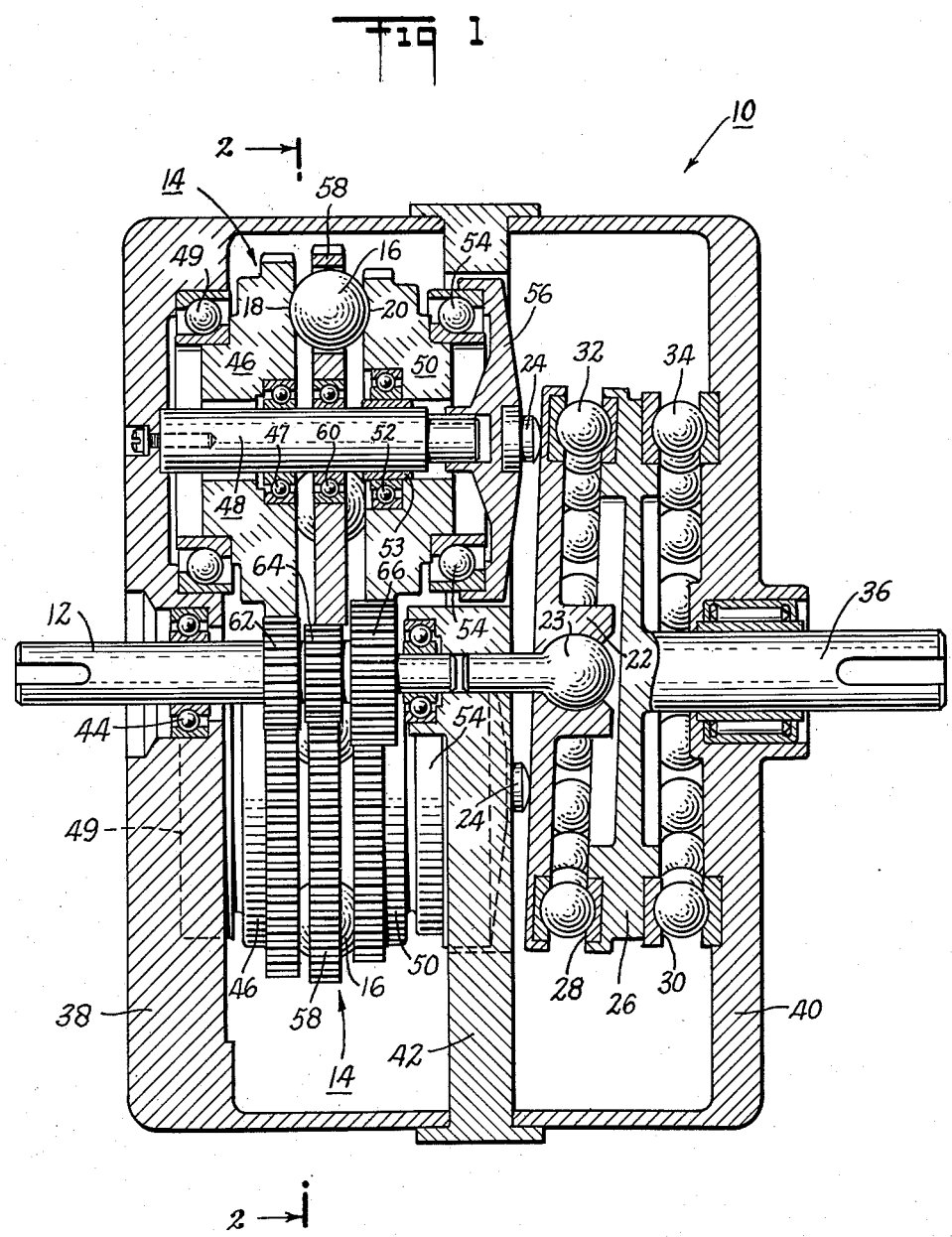
FIGURE 1 is a sectional side elevation view of a torque conversion or speed reduction mechanism incorporating one embodiment of the present invention.

The extremely light-weight and compactly-organized speed-changing devices of the present invention avoid the high sliding friction involved in gear train speed reducers, by employing rolling members in wavy-race units for converting high-speed rotary energy into reciprocating or oscillating longitudinal motion, which is then reconverted into torque, usually at much lower rotational velocities.

Initial conversion of the high velocity rotary input motion into reciprocating or linear oscillating motion occurs in the input portion at the left side of the unit shown in FIGURE 1. As seen in FIGURES 1 and 2, this input section of the mechanism includes a plurality of linear converters in the form of input cells 14 employing rolling members shown here as balls 16 rolling between undulated or wavy races 18 and 20. These linear converters or input cells are arranged circumferentially about the input shaft 12, as shown in FIGURES 2, 5, 6, and 7. In each of the cells 14, the two opposing wavy races 18 and 20 are formed as substantially matching undulated ball race surfaces, as shown in the developed views of FIGURES 3 and 4.

These matching wavy races 18 and 20 are driven at different velocities by gears keyed to the input shaft 12, and the resulting relative "difference" rotational velocity between the two cam races causes the balls 16 to roll around these circular races. The balls are maintained at all times in rolling relationship between the wavy races 18 and 20, and the two races 18 and 20 contact each of the balls 16 at substantially diametrically opposed points of contact. The balls 16 are therefore confined between substantially parallel portions of the two wavy races at all points in the rolling cycle. The substantial parallelism of these ball-confining tangent areas maintains the rolling contact of the balls with their two wavy races, and avoids slipping, non-rolling motion of the balls. The balls 16 are installed and maintained in spaced circumferential positions corresponding to single cycles in the wave of the wavy-cam surfaces, as shown in FIGURES 3 and 4.

During one operating cycle of each input cell 14, rolling motion of the balls caused by relative rotation of the two wavy races causes the balls to roll from the respective troughs toward the respective crests of the two wavy surfaces, causing the cam surfaces 18 and 20 to move axially apart by a distance A, as shown in FIGURE 4 when compared with FIGURE 3. Further relative rotation of the two cam surfaces causes the balls to roll therebetween from the respective crests to the next succeeding troughs, allowing the two cam surfaces 18 and 20 to draw together into the position shown in FIGURE 3. As relative rotation of the cam surfaces continues, reciprocating or axial oscillating motion of the driven cam surface 20 with an amplitude double that of the matched waves of the wavy cam surfaces is produced in each of the plurality of cells 14.

If one of the cam surfaces were flat, or had an undulation cycle of the same length but smaller amplitude than the other, the operation of each input cell 14 would be much the same, but axial oscillating output motion of smaller amplitude would be produced. Such modified input cells may have utility where smaller loads are carried, as in control servomechanisms or the like. For larger loads, however, the matched wavy surfaces 18 and 20 shown in FIGURES 3 and 4 will provide highly-reliable operation by maintaining rolling contact of the balls 16 with the wavy races 18 and 20, avoiding slipping and greatly increasing the load-carrying ability of the unit.

The reconversion of the axial oscillating motion occurs in the right half of the mechanism shown in FIGURE 1. There a wobble plate 22 mounted on a central ball and socket joint 23 is caused to wobble or rock. Each point of the periphery of plate 22 is caused to move with similar axial oscillating motion by the output motion of each of the cells 14. This linear oscillating motion is transmitted to the wobble plate 22 by the output bearing point 24 of each cell, and all of the points 24 are in substantial contact with the wobble plate near its periphery at all times.

The rocking or wobbling motion of the wobble plate 22 causes corresponding rotation of a cylindrical wedge member 26 having an inclined-plane input surface substantially corresponding to the maximum incline of the wobble plate 22, and an output plane surface normal to its axis of rotation. The two surfaces of this cylindrical wedge 26 are defined by the points of rolling contact of its peripheral circular races 28 and 30 with the balls 32 and 34, which are themselves in rolling contact with mating races on the wobble plate 22 and the output housing 40 of the unit, respectively. The resulting rotation of the cylindrical wedge 26 produces rotation of an output shaft 36 at the rotational output speed desired.

The mechanism of each of the cells 14 can be seen most clearly in FIGURES 1 and 2. The housing 10 of the speed-changing devices of the present invention preferably comprises a pair of shells or casings: an input casing 38 and an output casing 40, both enclosing the moving elements of the mechanism and respectively secured to a central spider 42. The input shaft 12 is rotatably positioned in a central portion of the input housing 38 in a suitable input bearing 44. The rotating undulated or wavy input race surface 18 in each of the input cells 14 is formed in a base member 46, rotatably mounted via bearings 47 on a fixed central shaft 48, and provided with thrust bearings 49 mounted in the input casing 38.

The rotating and axially movable matching undulated or wavy output race 20 is formed in an oscillating member 50, rotatably mounted on bearings 52 and adapted via sleeve 53 for axial sliding motion along the shaft 48. Member 50 is also provided with thrust bearings 54 mounted in a cap member 56 on which the hardened bearing point 24 is positioned.

The balls 16, positioned between the two wavy surfaces 18 and 20, are maintained in their desired angular relationship, spaced apart along the circumference of each race at intervals corresponding precisely with the "pitch" or trough-to-trough distance of the wavy undulation of these races, by a cage member 58 rotatably mounted on the bearings 60 for rotation about the shaft 48.

In the illustrated embodiments of the invention, the rolling members 16 are balls, and the wavy races 18 and 20 are generated with a sinusoidal wave form producing axial harmonic output motion of bearing points 24. It will be understood that other rolling members such as tapered roller bearings may be employed, and that the race members 46 and 50 may be formed with matched wavy races 18 and 20 of modified wave form.

The rotatable members 46, 50, and 58 are all provided with gear teeth cut around their peripheries and respectively engaging a series of gears 62, 64, and 66, all keyed to the driving shaft 12.

The gear 62 and the peripheral gear teeth of the member 46 engaged therewith may be cut to provide a gear reduction of 3:1 (120:40), for example, and if the input shaft 12 is rotating at 3,600 r.p.m., the member 46 with cam race 18 formed therein will then revolve about the shaft 48 at 1,200 r.p.m. The gear 66 and its mating member 50 with cam race 20 formed therein may be provided with teeth giving a speed reduction ratio (e.g., 225:74) selected to produce a rotational velocity for member 50 slightly different from that of member 46, 1,180, for example. The two cam members 46 and 50 will then rotate about shaft 48 in the same direction at different velocities, producing a relative rotational velocity therebetween of 20 r.p.m. The balls 16 are maintained in rolling contact with both cam races, and the cage 58 is thus provided with teeth meshing with those of the gear 64 and dimensioned (450:149) to provide a rotary speed for the member 58 exactly halfway between the speeds of the members 46 and 50, in the present case 1,190 r.p.m., thus maintaining the rolling contact between balls 16 with both of the cam races 18 and 20.

As shown in FIGURE 2, the wavy races 18 and 20 are respectively provided with a three-cycle undulation having three troughs and three crests, and three balls 16 are positioned in the cage 58 at the proper spacing illustrated in FIGURES 3 and 4. Accordingly, each two revolutions of the cam race member 50 relative to the cam race member 46 produce one complete revolution of ball cage 58, and therefore three complete cycles of axial oscillating motion of the element 50 longitudinally along the shaft 48. In the foregoing example, with a relative rotational velocity of 20 r.p.m. between the two cam elements 46 and 50, the cage 58 will rotate at 10 r.p.m. and the contact bearing point 24 will therefore oscillate axially through thirty complete cycles each minute.

In the embodiment shown in FIGURES 1 and 2, there are three independent and identical cells of cam plate pairs symmetrically positioned about the central input shaft 12. Each cell is provided with a contact point 24 reciprocating axially in a staggered phase relationship at the same velocity and all bearing upon the wobble plate 22. During assembly of the mechanism, the troughs and crests of the respective pairs of cam plates are arranged and oriented to oscillate in such a manner that the amplitude maxima of the contact bearing points 24 are successively timed in equal increments to provide a succession of axial driving forces applied to succeeding points about the circumference of the wobble plate 22. This is shown in FIGURES 6, 7 and 10, where four cells of sinusoidal wavy cam plates 46 and 50 produce a staggered succession of four sinusoidal oscillations of equal amplitude A.

This succession of impulses causes the wobble plate 22 to oscillate regularly about its central supporting ball 23. The cylindrical wedge member 26 is free to rotate with output shaft 36 and is impeded only by the rolling friction between the balls 32 and 34 in their respective races, and member 26 will be moved by the tangential component of the force exerted by the contact points 24 through the wobble plate 22 and the balls 32. The axial forces transmitted to wobble plate 22 by the cells produce a resultant force F acting normal to the inclined face of wedge member 26, transmitted by the balls 32. The timing of the amplitude maxima of the linear oscillations of the contact points 24 is such that the force F is always applied substantially at the "receding, uphill side" of the wedge member 26 as shown schematically in FIGURES 8 and 9. The force F has an axial component $F_A$ carried by output casing 40 to the supporting structure, but its tangetial component $F_T$ is opposed only by rolling friction of balls 32 and 34. Cylindrical wedge member 26 will therefore rotate about its central axis, producing the desired output rotation of the driven or output shaft 36.

The member 26 is shown in the drawings as a right circular cylinder bounded by an inclined boundary plane corresponding to its circular race accommodating the balls 32, but it will be understood that the peripheral shape of the member 26 is immaterial.

If the cylindrical wedge member 26 is provided with boundary planes respectively inclined at steeper angles than that illustrated in FIGURE 1, this tangential component $F_T$ will be correspondingly greater as indicated in FIGURES 8 and 9, but the rolling friction of the respective ball and race assemblies positioning the cylindrical wedge member 26 is necessarily so small that a very small angle of inclination will be sufficient to provide reliable operation of the speed reduction mechanism, while minimizing the total amplitude of the axial oscillating motion of the oscillating cam plate member 50 and the cap 56. These small amplitudes minimize the sliding friction in the ball and socket joint 23, and between the shaft 48 and the sleeve 53 slidably mounted thereon, positioned within and supporting the inner race of the bearing 52 upon which the oscillating cam plate member 50 is rotatably mounted.

As shown above, a tangential force component $F_T$ is employed to reconvert axial oscillations to torque, and the axial thrust resulting from the successive axial motion of the pairs of cam plates is conveyed from the fixed input housing 38, which may be secured or supported in any desired manner, to the thrust bearings 49 and the rotating cam plate member 46, through the balls 16 to the oscillating cam plate member 50 and thence via the thrust bearings 54 to the cap member 56 with its contact point 24 bearing against the wobble plate 22. The axial component of the forces imposed by the contact points 24 upon the wobble plate 22 is transmitted through the balls 32 and 34 and the cylindrical wedge member 26 to the output housing member 40, which may likewise be suitably supported in any desired manner.

In order to provide the desired succession of impulses around the periphery of the wobble plate 22, with a timed succession of maximum amplitudes, as shown in FIGURE 10, a minimum of three input cells should be employed, assembled in the appropriate timed phase relationship to provide these successive impulses, thus avoiding undesired reversals of the output shaft 36. Four, five, six, or more cells 14 may be employed, circumferentially arranged about the input shaft 12 substantially in the manner shown in FIGURE 2, with their axial oscillation cycles being timed to provide the desired succession of tangential force components $F_T$ about the periphery of wobble plate 22 as shown in FIGURE 10. A six-cell unit is illustrated in FIGURE 5 and, if necessary, the cells may be staggered lengthwise along the length of input shaft 12 within the input casing 38 in order to accommodate larger pluralities of cells 14. The three cells 14 shown in FIGURE 2, for example, could be supplemented by a second bank of three similar cells 14, with their central shafts arranged symmetrically between the original cells, as indicated at 48a in FIGURE 2. The oscillating output motions of the remote bank of cells should then be transmitted to the wobble plate between the cells of the adjacent bank by elongated members tipped by additional bearing points and acting along the axis of the shafts 48a.

A very wide range of speed reduction ratios is available with the speed-changing units of this invention. In the foregoing example, 3,600 r.p.m. input velocity was reduced to 30 r.p.m. at the output shaft 36. By employing suitable gear ratios between the driving gears 62, 64, and 66 and their respective driven rotatable cam plate members 46 and 50 and the cage 58, an extremely wide range of speed reduction ratios may be achieved as shown in the following table of examples:

*Table of Approximate R.P.M. and Speed Ratios*

| | Prime Mover, r.p.m. | Race 18, r.p.m. | Race 20, r.p.m. | Race Differential, r.p.m. | Cage 58, r.p.m. | Number of Cycles per Race | Axial Oscillations per Minute | Output Speed, r.p.m. | Ratio |
|---|---|---|---|---|---|---|---|---|---|
| 1 | 45,000 | 15,000 | 14,500 | 500 | 14,750 | 3 | 750 | 750 | 60:1 |
| 2 | 45,000 | 15,000 | 14,800 | 200 | 14,900 | 3 | 300 | 300 | 150:1 |
| 3 | 45,000 | 15,000 | 14,900 | 100 | 14,950 | 3 | 150 | 150 | 300:1 |
| 4 | 30,000 | 10,000 | 9,900 | 100 | 9,950 | 3 | 150 | 150 | 200:1 |
| 5 | 30,000 | 10,000 | 9,980 | 20 | 9,990 | 3 | 30 | 30 | 1,000:1 |
| 6 | 10,000 | 5,000 | 4,900 | 100 | 4,950 | 4 | 200 | 200 | 50:1 |
| 7 | 10,000 | 5,000 | 4,990 | 10 | 4,995 | 3 | 15 | 15 | 667:1 |
| 8 | 10,000 | 5,000 | 4,998 | 2 | 4,999 | 3 | 3 | 3 | 3,333:1 |
| 9 | 6,000 | 3,000 | 2,000 | 1,000 | 1,500 | 3 | 1,500 | 1,500 | 4:1 |
| 10 | 3,600 | 1,200 | 1,180 | 20 | 1,190 | 3 | 30 | 30 | 120:1 |
| 11 | 100 | 4,000 | 4,600 | 600 | 4,300 | 8 | 2,400 | 2,400 | 1:24 |

It should be noted that the last example in the foregoing table shows a speed multiplier arrangement, with eight cycles per race producing a speed increase ratio of 1:24. The mechanism of FIGURE 5 shows an eight-ball, six-cell arrangement in which each race has eight complete undulation cycles around its periphery.

Output speeds closer to the input speed may be achieved conveniently by employing cells 14 with four, five, six, or larger pluralities of the balls 16 arranged between race plates having corresponding pluralities of undulated cycles formed in their races. In FIGURE 5, for example, eight balls 16 are employed in each of the cells 14. With such embodiments of the present invention employing larger pluralities of cells or larger pluralities of balls in each cell, the load carried by each individual ball 16 and the corresponding wear of the balls and their mating cam surfaces 18 and 20 will be proportionately reduced, and deflection or deformation of the various load-carrying elements under load will also be reduced, requiring smaller allowances therefor during the engineering design of these speed-changing mechanisms.

Interchangeability of cell assemblies or of complete speed-changing units is facilitated by the simplicity of construction of these mechanisms. The entire housing 10, for example, with all its enclosed elements may be uncoupled and replaced by a different mechanism incorporating different gear ratios and providing a different speed reduction ratio if desired, and the small size and light weight of the mechanism greatly facilitates such substitution for selection of the speed reduction ratio desired. Furthermore, input casing 38 containing a set of input cells 14 dimensioned for producing a particular preselected speed reduction ratio may be conveniently removed and replaced by a different casing 38 containing a different set of cells 14 and designed to provide a different preselected speed ratio. If desired, the spider 42 may be made in two parts, one part being removable with the input casing 38 to facilitate substitution of different input casings as desired.

In addition, one or more of the speed-changing units of the present invention may be combined with each other or with other driving and clutching torque-transmitting elements to provide flexibility and control as desired in overall speed-changing systems.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. A speed-changing mechanism comprising, in combination, an exterior casing, an input shaft rotatably mounted in said casing, a plurality of motion converting mechanisms spaced about one end of said input shaft within said casing, each of said plurality of motion converting mechanisms including a pair of wavy race members rotatably mounted and connected to be driven at different rotational velocities by said input shaft, a plurality of rolling members held between said pair of wavy race members producing reciprocating motion of one of said race members, and wobble plate means positioned in said casing adjacent said mechanisms for converting said reciprocating motion into rotary motion.

2. A speed-changing mechanism comprising, in combination, a rotatably mounted input shaft, a plurality of motion converting mechanisms positioned about one end of said input shaft and connected to convert rotation of said input shaft to reciprocating motion, each of said plurality of mechanisms including a pair of wavy race members rotatably mounted and connected to be driven at different rotational velocities by said input shaft, a plurality of rolling members interposed between said pair of wavy race members, and wobble plate means for converting the reciprocating motion of said mechanisms to rotary motion.

3. The combination defined in claim 2 in which said pairs of wavy race members are drivingly connected to said input shaft in staggered phase relationship providing reciprocating motion with successively and periodically timed maximum amplitudes producing continuous rotary output motion from said mechanism.

4. The combination defined in claim 2 in which said wavy races are substantially sinusoidal.

5. The combination defined in claim 2 in which said wavy race members are formed with equal numbers of undulation cycles, with the same equal number of rolling members being interposed between each pair of said races.

6. The combination defined in claim 2 in which said rolling members are balls.

7. The combination defined in claim 2 in which said rolling members are confined in a cage rotatably mounted between and coaxial with said race members, said cage being connected to be driven by said input shaft at a rotational speed halfway between the different rotational velocities of said race members.

8. A speed-changing mechanism comprising in combination
 (A) a supporting casing,
 (B) an input shaft rotatably mounted in said casing,
 (C) a plurality of motion converting mechanisms supported in said casing coupled with said input shaft,
  (1) each mechanism being continuously operated by rotation of said input shaft and
   a. producing a reciprocating motion in response to said shaft rotation and at a cycle frequency different therefrom,
  (2) said mechanisms all producing said reciprocating motions at the same cycle frequency with a selected phase relation being maintained between them,
 (D) a plate pivotally mounted in said housing and
  (1) coupled with said mechanisms to be continuously rocked by the reciprocating motions produced by said mechanisms, and
 (E) an output member rotatably mounted in said casing coupled with said plate,
  (1) said output member being rotated at a rate different from the rotation rate of said input shaft by the rocking imparted to said plate by said mechanisms when said input shaft is rotated.

9. A speed-changing mechanism comprising in combination
 (A) a supporting casing
 (B) an input shaft rotatably mounted in said casing,
 (C) a plurality of motion converting mechanisms each including
  (1) a pair of adjacent members with annular facing surfaces having varying axial separation therebetween,
  (2) a plurality of rolling members disposed between said annular facing surfaces of each mechanism,
  (3) one of said rotatable members being supported for reciprocating motion,
  (4) said mechanisms being mounted in said casing with their rotatable members drivingly coupled with said input shaft,
  (5) said pair of members in each mechanism being driven at different rates by rotation of said input shaft,
  (6) said mechanisms each converting the rotation of said input shaft to reciprocating motion of said one rotatable member at a cycle frequency different from the rotation rate of said input shaft,
 (D) a wobble plate pivotally mounted in said casing and coupled with said link to be rocked by the reciprocating motion produced by said mechanisms, and
 (E) output means rotatably mounted in said casing and coupled with said wobble plate,
  (1) said output means being rotated at a rate different from said input shaft in response to the rocking imparted to said plate by said mechanisms when said input shaft rotates.

10. A motion converting mechanism associated with a rotatable input shaft and providing linear reciprocating motion having a cycle frequency different from the rotational frequency of said input shaft, comprising, in combination, a pair of wavy race members having successive troughs and crests, said race members being coaxially and rotatably mounted and connected to be driven at different rotational velocities by said input shaft, and a plurality of rolling members held between said pair of wavy race members, whereby relative rotational motion of said pair of race members produces reciprocating relative axial motion of said race members between a maximum separation where said rolling members are located between opposed crests of said race members and a minimum separation where said rolling members are located between opposed troughs of said race members.

References Cited in the file of this patent

UNITED STATES PATENTS

| 1,127,065 | Milne | Feb. 2, 1915 |
| 2,119,955 | Litton | June 7, 1938 |
| 2,149,321 | Taylor et al. | Mar. 7, 1939 |
| 2,211,741 | Elwell | Aug. 13, 1940 |
| 2,545,562 | Thiel | Mar. 20, 1951 |
| 2,836,985 | Maroth | June 3, 1958 |